United States Patent Office 2,922,772
Patented Jan. 26, 1960

2,922,772

MOLDING COMPOSITIONS OF VINYLIDENE RESIN POLYMERS AND QUATERNARY AMMONIUM DESTATICIZING COMPOUNDS

Myron A. Coler, Scarsdale, and Arnold S. Louis, Riverdale, N.Y.

No Drawing. Application March 30, 1956
Serial No. 574,949

12 Claims. (Cl. 260—32.6)

This invention relates to improved synthetic resin molding compositions and, in particular, to such molding materials which avoid the highly undesirable effects of electrostatic charge build-up during the molding operation.

It has been found that the process of molding certain synthetic resins causes the generation of high electrostatic charges. This evidences itself frequently by the formation of "crows feet," "fern-like" and "zig-zag" patterns through the attraction of fine dust particles from the atmosphere. Such patterns are sometimes erroneously interpreted as being molding flaws.

The literature discloses many additives for rendering synthetic resins destaticized. Many such additives depend on the property of deliquescence to cause the article to be wetted by moisture from the air. The moisture renders the surfaces of the article sufficiently conductive to prevent the further accumulation of electrostatic charges. Molding operations are normally carried out at temperatures substantially in excess of the boiling point of water and, therefore, as molded, the molded article is relatively moisture-free and thus subject to the accumulation of electrostatic charges at the time of molding.

Still other additives which are inherently destaticizing agents tend to undesirably affect the physical properties of the plastic. For example, a lowering of the heat distortion point may occur, there may also be a change in color, gloss, hardness or water absorption characteristics, or blemishes may result from decomposition of additives or evaporation of low boiling fractions. The resulting product may also become toxic if the additive is in itself toxic.

Our invention, disclosed hereinafter, provides a plastic composition which avoids the disadvantages of acquiring electrostatic charges and, in particular, which is not susceptible to electrostatic charging during the molding operation or upon release from the mold.

This invention does not depend on deliquescent action and, therefore, produces results substantially independent of humidity. This advantage of this invention is important in the elimination of the tendency for dust patterns to form on freshly molded plastic articles.

We have found that the quaternary ammonium compounds resulting from the reaction of selected totally hydroxyalkylated alkylene diamines with alkyl salts may be incorporated into synthetic molding composition to provide antistatic properties.

A totally unexpected advantage of the above-named group of additives was discovered during molding tests of material prepared in accordance with this invention. It was found that the additives disclosed hereinafter improved flow properties of the base plastic so as to permit shorter molding cycles as well as improved filling of thin mold sections; reduced breakage of thin-walled moldings and easier mold release were obtained.

An object of this invention is, therefore, to provide a method for eliminating the formation of electrostatic charges on molded plastic articles.

Another object is to provide a plastic molding composition having improved molding properties.

Still another object is to provide a plastic molding composition having preferred flow properties when injection molded.

A particular object is to provide a plastic material which is substantially non-susceptible to acquiring electrostatic charges.

A particular object of this invention is to provide a method for eliminating the formation of electrostatic charges on molded plastic articles during and especially immediately after the molding operation.

Another object is to provide articles comprising polystyrene compositions which are free of the effects of electrostatic charges.

Still another object of this invention is to provide an improved plastic composition.

A still different object is to reduce the electrostatic charge on polystyrene objects made by injection moldings.

A further object of this invention is to provide a polystyrene composition of superior molding properties.

Further objects and advantages will become apparent and still others will be pointed out with particularity as the following detailed description proceeds.

The quaternary ammonium compounds resulting from the reaction of totally hydroxyalkylated alkylene diamines with alkyl or aryl alkyl halides or with alkyl or aryl alkyl salts may be incorporated into synthetic molding compositions to produce antistatic molding compositions. Either one or both of the nitrogen atoms of the diamine radical may be quaternized.

The alkylene radical should contain from 2 to 6 carbon atoms while the hydroxyalkyl radical should contain from 2 to 8 carbon atoms. We prefer to employ the totally hydroxypropylated alkylene diammonium salts because of their better stability.

Selected totally hydroxyalkylated alkylene diamine alkyl ammonium salts suitable for the purposes of this invention include totally hydroxyalkylated ethylene, propylene, butylene, trimethylene and hexamethylene diammonium salts.

The totally hydroxyalkylated alkylene alkyl diammonium salts used are represented by the following formula:

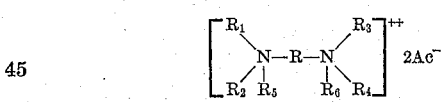

wherein: R is an alkylene radical containing from 2 to 6 carbon atoms; $R_1$, $R_2$, $R_3$ and $R_4$ are hydroxyalkyl groups containing from 2 to 8 carbon atoms, and may be the same or different; $R_5$ and $R_6$ are each an alkyl or aryl alkyl radical and Ac represents a monovalent anion. Anions other than monovalent anions could equally well be used.

The formula shown represents the result of quaternizing both nitrogen atoms of the diamine group. Compounds in which only one nitrogen atom is quaternized are also useful for the purpose of this invention. The ammonium ion from such compounds is monovalent.

It is also within the scope of this invention to use quaternary ammonium compounds of alkylene diamines in which the two nitrogen atoms are quaternized with different alkyl salts.

Typical quaternizing reactants include the following: ethyl chloride, methyl chloride, benzyl chloride, dimethyl sulphate, ethyl phosphate, octyl phosphate.

The procedures for producing the quaternary compounds are well known processes and, therefore, are not described herein. It has been discovered in the course of experimentation with materials of the type described above that certain of the quaternary ammonium salts tend to cause puffing or the formation of blowholes during extrusion or molding. The situation is adequately covered if only those hydroxyalkylated polyamines having a vapor pressure less than 760 mm. at 225° C. are used. If more volatile compounds are used, gassing during extrusion or molding becomes objectionable.

While additives having the above described tendency are obviously not desirable in compositions which are to be molded or extruded at high temperatures, it has been found that such materials can be used to make up a minor proportion of the total additive when used in company with preferred additives.

By incorporating any of the above mentioned additives or mixtures thereof in polystyrene or other resinous polymers, the destaticizing properties are attained without incurring any of the undesirable features enumerated above. The quantity of additive employed is between 1 and 7% by weight based on the total product and preferably between 2 and 6%. The upper limit is a matter of choice dictated by considerations of economy and is not critical. For example, 10% or more may be used and the desired destaticizing results obtained, although at higher concentrations there is danger of affecting physical properties adversely.

Be it observed that it will often be advantageous to prepare a master batch of resin with incorporated additive, said master batch containing far more additive than is recommended for use in molding operations, and being later cut back by extrusion or by being otherwise blended with untreated resin. Such a concentrate may well be sold, particularly in the "clear" or "natural" color for blending with untreated resin of various colors or of its own color. The master batch may contain up to 50% of the additive.

By way of illustration, there are given hereinafter a number of examples wherein the additive, quantity of additive and the resinous polymer employed are varied. Since hundreds of combinations are possible it becomes impractical to show more than a few typical compositions with additives so selected from the described group as to show operability of the group as a whole and therefore such examples shall not be regarded as limiting in any sense.

Where it is desired to prepare a master batch or to market a concentrated blending material, the procedures of Examples 16 and 18 are preferred. In plants where mass polymerization is employed the procedures of Examples 17 and 18 will be especially useful.

In cases where plastic chip is to be treated or where the polymerization methods in use are not adapted to taking advantage of the processes mentioned above, the process of Example 8 is preferred for its simplicity and freedom for extra drying steps.

Where it is desired to incorporate pigment in the plastic as well as to render it antistatic, the processes of Examples 1 and 2 are preferred. This procedure is claimed in our copending application entitled "Process for Making Plastic Compositions," Serial No. 532,132, filed September 2, 1955.

In carrying out this last referred to process, the additive is dissolved in a solvent which is a non-solvent for the plastics employed. The solution and plastic in comminuted form are then mixed together. The solvent is then removed so as to deposit the additive over the plastic particles.

In accordance with particular examples of this last mentioned procedure, from 0.1 to 0.7 pound of the additive is dissolved in 1 pound of isopropyl alcohol. Sufficient comminuted resinous polymer to make a total of 10 pounds of additive plus polymer is mixed with the solution. The alcohol is then evaporated in an exhaust oven at 65° C. for 36 hours with occasional agitation so as to leave the polymer granules uniformly coated with said additive.

The coated material is then fed through a Windsor type RC-65 twinscrew extruder equipped with a series of ⅛" square orifices. The die and barrel are maintained at a suitable temperature for the particular polymer, such as 400° F. for polystyrene. The extruded material may then be chopped up into molding granules.

The molding granules may then be injection molded, as for example on a Reed-Prentice 8-ounce injection molding press with a heater temperature of 600° F. for polystyrene. For other polymers conventional molding temperatures prescribed by the polymer supplier may be employed.

As a test of the effectiveness of the additive the resulting articles may be promptly sprayed with fine bentonite dust by means of a hand sprayer. The dust will collect in patterns on charged areas. Additional moldings may be set aside and observed periodically for several weeks. Using a Keithley electrostatic voltmeter, the potential may be measured between the molding and ground immediately after withdrawal from the mold.

As a control means identical articles may be molded from the same polymer not using the additive.

*Example 1*

The foregoing procedure was carried out using the following composition:

| | Lbs. |
|---|---|
| Totally hydroxypropylated ethylene dimethyl diammonium dichloride | 0.3 |
| Polystyrene granules, 10–60 mesh (Monsanto Chemical Co., L2020 PIX-6) | 9.7 |

The dust test showed the absence of charged areas. The elastrostatic voltmeter reading was less than 1 volt.

One control article was sprayed with the bentonite dust immediately after molding and a well defined fern-like pattern was immediately apparent. The same control article yielded a 20 volt reading on the electrostatic voltmeter upon removal from the mold. After long term storage another unmodified polystyrene molding showed definite dust patterns whereas the modified polystyrene article showed but a few isolated gravity deposited grains.

The molding characteristics of the modified polystyrene were judged to be superior to that of the control or unmodified polystyrene by the molding machine operator on the basis of obviously improved ease of mold release and lower breakage of thin walled moldings.

*Example 2*

The procedure of Example 1 was repeated with the exception that 0.1 gram of phthalocyanine blue was suspended in the alcohol and put through a colloid mill together with the additive prior to incorporation into the polystyrene. The resulting molded product was a uniform attractive pale blue color.

When tested as in Example 1, the molding and destaticizing characteristics were found to be identical to the treated product of Example 1.

*Example 3*

Example 1 was repeated with an additive concentration of 1% by weight of the total product. The resulting molding exhibited poor non-electrostatic properties, as measured by the Keithley voltmeter. A small amount of dust was collected in patterns after storage for two weeks.

*Example 4*

Example 1 was repeated using 0.6 pound of additive and 9.4 pounds of polystyrene. A slight improvement in destaticizing properties was noted.

*Example 5*

The procedure of Example 1 was repeated with 0.6 pound of totally hydroxyoctylated ethylene dimethyl diammonium dichloride and an extruder die temperature of 375° F. utilizing 9.4 pounds polymethylmethacrylate as the resinous polymer. The resultant molding had substantially the same hardness as an unmodified control molding and exhibited excellent non-static and molding properties. The Keithley voltmeter reading was one volt directly after the molding operation.

Example 6

The procedure of Example 1 was repeated using the quaternary salt resulting from the reaction of one mol of benzyl chloride with one mol of hydroxypropylated hexamethylene diamine. The results were comparable.

Example 7

2.0 lbs. of isopropyl alcohol and 0.3 lbs. of the additive used in Example 6 were mixed together to form a solution of watery consistency. The foregoing mixture was worked in a sigma blade mixer with 9.7 pounds of polystyrene. After 10 minutes the particles were found to be coated with the additive. The coated particles were then dried at 65° C. for 24 hours to remove the alcohol. The coated particles were then put through the extruder, chopped and molded as in Example 1. The resulting products showed substantially the same properties as the modified compositions of Example 1.

Example 8

0.6 pound of totally hydroxypropylated ethylene amine ethyl ammonium chloride and 9.4 pounds of polystyrene granules as used in Example 1 were thoroughly mixed in a sigma blade mixer. The mixture was then extruded, chopped and molded as in Example 1. The molded articles showed no discernible electrostatic charge as measured on the Keithley meter. The molded articles showed no tendency to collect dust in patterns during a 30-day storage test.

Example 9

Example 1 was repeated using as the quaternary salt, totally hydroxypropylated propylene octyl ammonium phosphate. The results were comparable.

Example 10

The procedure of Example 1 was repeated using a so-called high impact polystyrene which was a plastic alloy of 85% polystyrene, 5% polybutadiene, 10% polyacrylonitrile.

The molded product was compared with a control specimen prepared in identical fashion with the exception that the additive was omitted. The two specimens were opaque in appearance. Immediately after molding the treated material showed a charge of 1 volt whereas the unmodified control showed a charge of 15 volts.

Example 11

The procedure of Example 1 was repeated using 0.6 lb. of totally hydroxypropylated butylene dibenzyl diammonium phosphate, 9.4 lbs. of polyvinylchloride and a die temperature of 390° F. The resulting molded articles were similar in appearance to unmodified polyvinylchloride and exhibited excellent molding and antistatic properties. The electrostatic voltmeter test yielded a reading of about 2 volts whereas untreated polyvinylchloride showed a reading of 20 volts upon molding.

Example 12

The procedure of Example 4 was repeated with an extruder die temperature of 350° F. utilizing ⅛" polyethylene pellets as the resinous polymer and a totally hydroxypropylated trimethylene diethyl diammonium phosphate as the additive. Immediately after molding, a Keithley voltmeter reading of about 1.5 volts was noted.

Example 13

Example 1 was repeated using the quaternary salt resulting from reacting 1 mol of dimethyl sulphate with 1 mol of totally hydroxypropylated trimethylene diamine. The results were comparable.

Example 14

Example 1 was repeated using the quaternary salt resulting from the reaction of 1 mol of totally hydroxypropylated butylene diamine and 1 mol of ethyl chloride. The results were substantially identical.

Example 15

60 grams of totally hydroxpropylated ethylene dimethyl diammonium dichloride dissolved in 60 grams of water, were incorporated into 666 grams of polystyrene emulsion containing 30% of polystyrene solids.

760 grams of polystyrene (granulated) were placed in a Baker-Perkins mixer. With the mixer in operation, the polystyrene emulsion additive mixture was slowly added. The resultant slurry was then dried at 65° C. for 48 hours at which time it was found to be water-free. The resultant mixture which contained 6% of the additive, when molded as in Example 1, yielded transparent moldings which when tested as in Example 1, exhibited destaticized characteristics similar to the modified product of Example 1.

Example 16

40 grams of totally hydroxyethylated propylene dimethyl diammonium sulphate, dissolved in 40 grams of water, was added to 400 grams of a 30% solids polystyrene emulsion. This mixture was spray-dried and gave a free flowing polystyrene powder containing 1 part of the additive to 3 parts of polystyrene. The resultant concentrate was tumbled with 820 grams of a granulated polystyrene. The resultant blend was injection molded under conventional polystyrene molding conditions and yield destaticized molding having properties comparable to that produced by the procedures of Example 1.

Example 17

2.4 grams of $\alpha,\alpha'$ azodiisobutyronitrile was dissolved in 960 grams of monomeric styrene along with 40 grams of totally hydroxypropylated ethylene dimethyl diammonium sulphate. The solution was placed in a heated agitated reaction kettle into which nitrogen was bubbled. The styrene solution was heated at 70° C. for 1½ hours until an exothermic reaction took place. The reaction was continued for an additional 30 minutes with the temperature being gradually increased to 90° C. until considerable polymerization took place as evidenced by an increase in viscosity. The mixture was transferred to air-free containers which were then sealed. The containers were maintained at a temperature of 90° C. for 48 hours. The resultant polymer was injection molded under normal polystyrene molding conditions. Moldings were clear and appeared equivalent to conventional polystyrene, except that when rubbed with a wool cloth they would not become electrostatically charged as does unmodified polystyrene when so rubbed.

Example 18

2.0 grams of $\alpha,\alpha'$ azodiisobutyronitrile was dissolved in 800 grams of monomeric styrene along with 200 grams of totally hydroxypropylated ethylene dimethyl diammonium chloride. The solution was placed in a heated agitated reaction kettle into which nitrogen was bubbled. The suspension was heated at 70° C. for 1½ hours until an exothermic reaction took place. The reaction was continued for an additional 30 minutes with the temperature being gradually increased to 90° C. Considerable polymerization took place as evidenced by an increase in viscosity. The mixture was transferred to air-free containers which were then sealed. The containers were held at 90° C. for 48 hours. The resultant polymer was extruded and chopped into granules. Later, 200 grams of the resulting granules were mixed with 800 grams of untreated polystyrene granules, extruded, chopped and injection molded under normal polystyrene molding conditions. The resulting moldings were similar in quality to those made in Example 1.

For the purpose of illustrating the invention, examples have been shown of the application of our invention to polystyrene, polyethylene, polyvinylchloride and polymethylmethacrylate. We wish it to be understood that the invention likewise may be utilized in treating other polymers such as polyacrylonitrile, polyfluoroethylene, polytrifluoromonochloroethylene, polybutadienes, halogenated polystyrenes, and mixtures and copolymers of these materials.

The term "vinylidene" as used herein is intended to define monomers containing a polymerizable unsaturated $H_2C=C<$ structure and is generic to vinyl and vinylidene monomers. Each of the polymers specifically exemplified in the preceding examples, namely: polystyrene, polymethylmethacrylate, polyvinyl chloride and polyethylene, is a polymer of a vinylidene monomer, so defined.

By "plastic alloy" as used herein we intend to encompass compositions comprising two or more types of polymeric molecules whether prepared by copolymerization or by intimate mixing.

Mixtures of the various additives may be employed providing the total amount is within the disclosed proportions for a single specie.

It should be understood that the illustrative lists of suitable quaternizing reactants and synthetic resins given earlier is not intended to be limiting in any way whatsoever.

While we have disclosed what is at present considered the best mode for carrying out our invention, we appreciate that it will be obvious to those skilled in the art that various changes and modifications may be made therein without departing from the invention, and it is, therefore, aimed in the appended claims to cover all such changes and modifications as fall within the true spirit and scope of the invention.

What we claim is:

1. A composition of matter comprising a polymer of a vinylidene monomer and between 1 and 50% by weight of the composition of a material destaticizing said polymer and which is selected from ammonium salts resulting from the quaternization of at least one nitrogen in hydroxyalkylated alkylene diamines represented by the formula

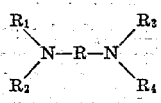

wherein R is an alkylene group with from 2 to 6 carbon atoms, and $R_1$, $R_2$, $R_3$ and $R_4$ are hydroxyalkyl groups with from 2 to 8 carbon atoms, the quaternizing agent being one selected from the group consisting of alkyl and arylalkyl salts.

2. The composition of claim 1 in which the hydroxyalkyl groups are hydroxypropyl groups.

3. The composition of claim 2 wherein the alkylene group is an ethylene group.

4. The composition of claim 2 wherein the alkylene group is a butylene group.

5. The composition of claim 2 wherein the alkylene group is a propylene group.

6. The composition of claim 2 wherein the alkylene group is a trimethylene group.

7. The composition of claim 2 wherein the alkylene group is a hexamethylene group.

8. The composition of claim 1 in which the salt comprises 1–7% by weight of the composition.

9. The composition of claim 1 wherein the polymer is polystyrene.

10. The composition of claim 1 wherein the polymer is polyethylene.

11. The composition of claim 1 wherein the polymer is polymethylmethacrylate.

12. The composition of claim 1 wherein the salt has a vapor pressure less than 760 mm. at 225° C.

References Cited in the file of this patent

UNITED STATES PATENTS

| | | |
|---|---|---|
| 2,271,468 | Watkins | Jan. 27, 1942 |
| 2,403,960 | Stoops et al. | July 16, 1946 |
| 2,593,787 | Parker | Apr. 22, 1952 |
| 2,697,118 | Lundsted et al. | Dec. 14, 1954 |

UNITED STATES PATENT OFFICE
CERTIFICATE OF CORRECTION

Patent No. 2,922,772                                       January 26, 1960

Myron A. Coler et al.

It is hereby certified that error appears in the printed specification of the above numbered patent requiring correction and that the said Letters Patent should read as corrected below.

Column 4, line 29, for "elastrostatic" read --electrostatic --; column 5, line 36, Example 9, before "octyl" insert -- amine --; column 6, line 9, Example 15, for "hydroxpropylated" read -- hydroxypropylated --.

Signed and sealed this 16th day of August 1960.

(SEAL)
Attest:

KARL H. AXLINE
Attesting Officer

ROBERT C. WATSON
Commissioner of Patents